United States Patent [19]
Nakamura

[11] Patent Number: 5,921,881
[45] Date of Patent: Jul. 13, 1999

[54] NARROW BICYCLE CHAIN WITH INNER LINKS THAT RECEIVE SPROCKET TEETH WITHIN A BOTTOM RECESS

[75] Inventor: Yasushi Nakamura, Itami, Japan

[73] Assignee: Shimano, Inc., Osaka, Japan

[21] Appl. No.: 08/755,487

[22] Filed: Nov. 21, 1996

[51] Int. Cl.$^6$ ............. F16G 13/04; F16G 13/02; F16H 7/06

[52] U.S. Cl. ............. 474/217; 474/157; 474/220; 474/229

[58] Field of Search ............. 474/212, 213, 474/216, 217, 219, 220, 226, 228, 229, 230, 78, 79, 153, 155, 156, 157, 160

[56] References Cited

U.S. PATENT DOCUMENTS

| | | | |
|---|---|---|---|
| 1,090,380 | 3/1914 | Brampton . | |
| 1,634,642 | 7/1927 | Bens | 474/217 |
| 2,722,843 | 11/1955 | Edwards, Jr. | 474/213 |
| 3,495,468 | 2/1970 | Griffel | 74/229 |
| 3,835,721 | 9/1974 | Hoffstetter | 74/245 R |
| 4,102,216 | 7/1978 | Nagano | 74/245 R |
| 4,741,725 | 5/1988 | Ingold | 474/212 |
| 5,288,278 | 2/1994 | Nagano | 474/228 |
| 5,464,374 | 11/1995 | Mott | 474/228 |

FOREIGN PATENT DOCUMENTS

| | | | |
|---|---|---|---|
| 0 316 239 A1 | 5/1989 | European Pat. Off. | F16G 13/06 |
| 707519 | 7/1931 | France | 3/8 |
| 771741 | 10/1934 | France | 3/5 |
| 2337076 | 7/1977 | France . | |
| 55-178490 | 12/1980 | Japan | B62M 9/12 |
| 60-69348 | 4/1985 | Japan | F16G 13/07 |
| 19121 | 10/1896 | United Kingdom . | |
| 20011 | 11/1896 | United Kingdom . | |
| 23067 | 8/1898 | United Kingdom . | |
| 0015941 | 10/1916 | United Kingdom | 474/217 |
| 735919 | 8/1955 | United Kingdom . | |
| 1572706 | 7/1980 | United Kingdom | F16G 13/02 |

*Primary Examiner*—Charles A. Marmor
*Assistant Examiner*—Matthew A. Kaness
*Attorney, Agent, or Firm*—James A. Deland

[57] ABSTRACT

A derailleur bicycle chain includes a plurality of intermediate links, a plurality of pairs of outer links, and a plurality of fasteners. Each fastener connects an end of one of the plurality of intermediate links between a corresponding pair of outer links so that the plurality of intermediate links alternate with the plurality of pairs of outer links. Each intermediate link defines a recess between each end thereof for receiving a sprocket tooth therein, and each end of each intermediate link forms drive faces facing toward and away from the recess.

25 Claims, 4 Drawing Sheets

NARROW BICYCLE CHAIN WITH INNER LINKS THAT RECEIVE SPROCKET TEETH WITHIN A BOTTOM RECESS

BACKGROUND OF THE INVENTION

The present invention is directed to bicycle chains and, more particularly, to a narrow bicycle chain which can be used with multiple sprocket assemblies having closely spaced sprockets.

FIG. 1 is a diagram illustrating a typical bicycle chain drive mechanism. As shown in FIG. 1, crank arms 1 having pedals 3 are rotatably coupled to a bicycle frame 2. A chainwheel assembly C comprising a plurality of sprockets, for example, C1 and C2, are connected to crank arms 1 so that rotating pedals 3 in a circular manner causes sprockets C1 and C2 to rotate together with crank arms 1. A freewheel assembly F comprising a plurality of sprockets F1, F2, etc. are mounted to the rear wheel of the bicycle (not shown), and a chain 4 selectively engages one of the chainwheel sprockets and one of the freewheel sprockets. A front derailleur 5 having a chain guide 6 is provided to switch the chain among the plurality of chainwheel sprockets, and a rear derailleur 7 having a guide pulley 8 and a tension pulley 9 is provided to switch the chain among the plurality of freewheel sprockets.

It is desirable to increase the number of sprockets, particularly in the rear freewheel, to provide the bicyclist with a greater choice of gears. However, the amount of lateral space in which to mount the chainwheel and/or freewheel is limited by the design of the bicycle and accepted design standards. Thus, in order to fit more sprockets into the available space, it is usually necessary to decrease the spacing between the adjacent sprockets. On the other hand, the minimum spacing between adjacent sprockets is limited by the width of the chain.

FIG. 2 is a top view of a segment of the conventional chain 4. A typical chain has pairs of outer links 10A and 10B which alternate with pairs of inner links 11A and 11B, wherein each pair of outer links 10A and 10B is connected to a corresponding pair of inner links 11A and 11B using a press-fit connecting pin 12. More specifically, the ends of each outer link 10A and 10B and the ends of each inner link 11A and 11B have openings for receiving connecting pin 12 therethrough. The corresponding ends of one pair of outer links 10A and 10B are aligned with the ends of an associated pair of inner links 11A and 11B, with the inner links 11A and 11B disposed laterally inwardly of the outer links 10A and 10B, so that the openings in the ends are aligned with each other. The ends of inner links 11A and 11B include flange sections 11C and 11D which abut each other and define the openings of inner links 11A and 11B. A roller 13 is disposed between the pair of inner links 11A and 11B and is rotatably supported by flange sections 11C and 11D. The connecting pin 12 passes through the opening in each link end 10A, 10B, 11A, and 11B such that the connecting pin 12 is press fit in the outer link ends 10A and 10B.

The lateral width of a typical chain 4 thus equals the top width of two outer links 10A and 10B plus the top width of two inner links 11A and 11B plus the width of the roller 13 (which is approximately equal to the width of the flange sections 11C and 11D). As a result, the number of sprockets in the multiple freewheel assembly is limited accordingly.

SUMMARY OF THE INVENTION

The present invention is directed to a derailleur bicycle chain that eliminates the width of one of the pairs of link plates so that the chain may be used with a multiple sprocket assembly having a greater number of sprockets than is currently possible. In one embodiment of the present invention, a chain includes a plurality of intermediate links, a plurality of pairs of outer links, and a plurality of fasteners. Each fastener connects an end of one of the plurality of intermediate links between a corresponding pair of outer links so that the plurality of intermediate links alternate with the plurality of pairs of outer links. Each intermediate link defines a recess between each end thereof for receiving a sprocket tooth therein so that each intermediate link performs the function normally performed by the roller and corresponding pair of inner links in a conventional chain.

In a more specific embodiment, a phantom line connecting the fasteners at each end of each intermediate link intersects the recess therebetween so that each sprocket tooth engaged by the chain is sandwiched between the fasteners, and each end of each intermediate link forms drive faces facing toward and away from the recess. Each intermediate link has a generally flat plate shape and has a thickness approximately equal to the sprocket teeth to minimize the width of the chain. To accommodate a reduced thickness, the intermediate link may be strengthened by providing a rib or thickened section at a middle portion of the link.

DETAILED DESCRIPTION OF THE EMBODIMENTS

Figure 1:
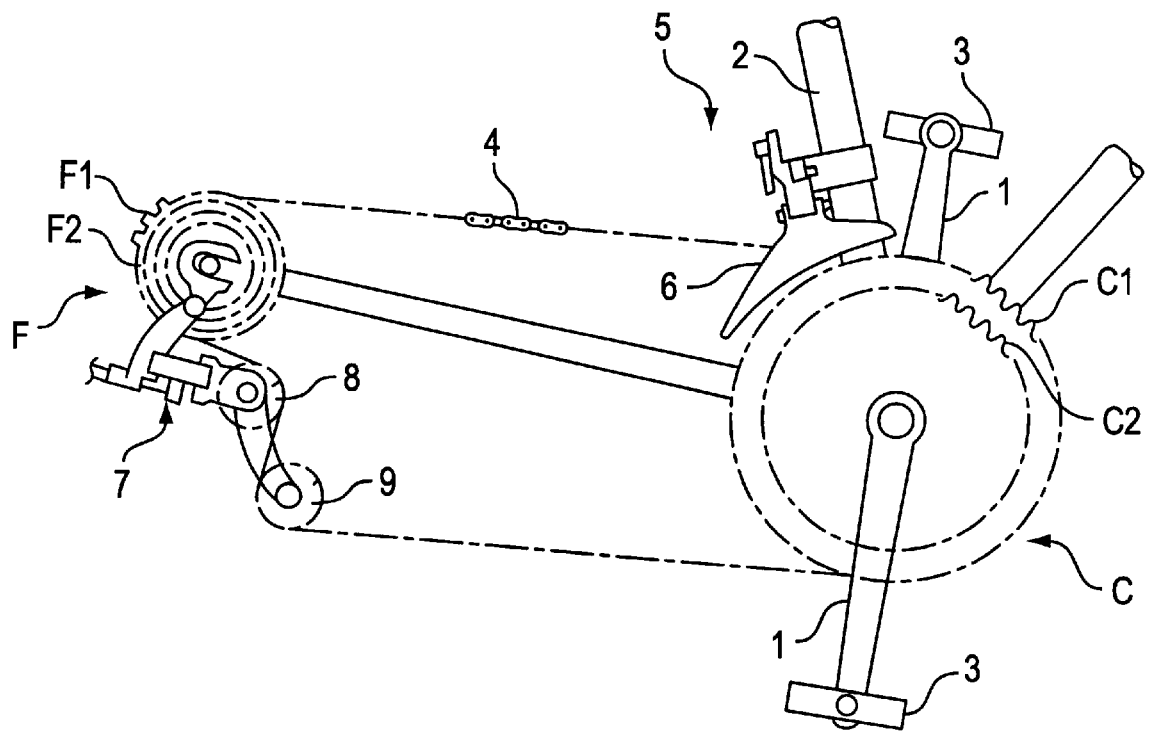
FIG. 1 is a diagram illustrating a typical bicycle chain drive mechanism.
Figure 2:
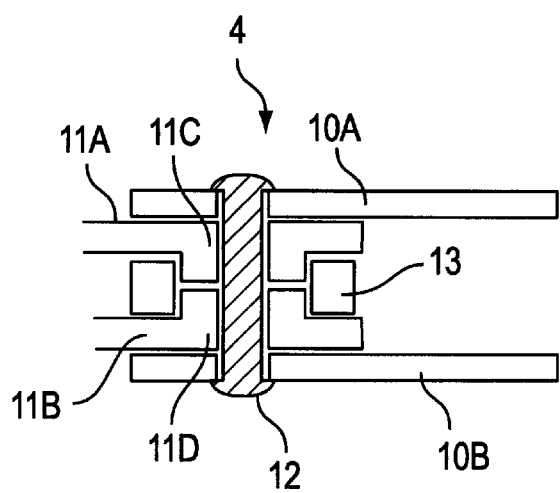
FIG. 2 is a top view of a typical bicycle chain.
Figure 3:
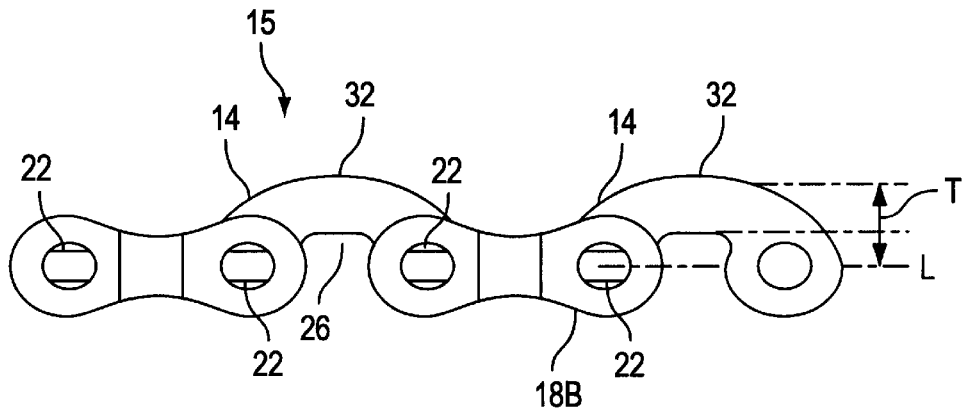
FIG. 3 is a side view of a particular embodiment of a bicycle chain according to the present invention.
Figure 4:
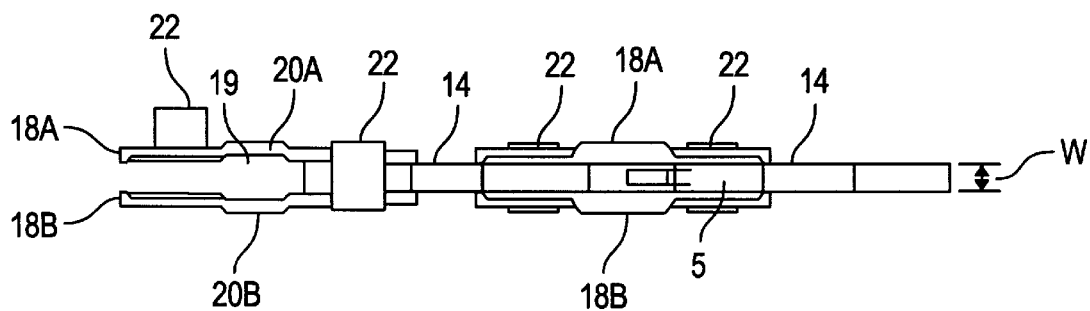
FIG. 4 is a top view of the bicycle chain shown in FIG. 3.

FIG. 3 is a side view, and FIG. 4 is a top view, of a particular embodiment of a bicycle chain 15 according to the present invention. As shown in those figures, bicycle chain 15 includes a plurality of intermediate links 14, a plurality of pairs of outer links 18A and 18B, and a plurality of fasteners (e.g., connecting pins) 22. Each fastener 22 connects an end of one of the plurality of intermediate links 14 between a corresponding pair of outer links 18A, 18B so that the plurality of intermediate links 14 alternate with the plurality of pairs of outer links 18A, 18B. In this embodiment, each intermediate link 14 is a single solid member having a generally uniform width W, wherein the width W of each end of the plurality of intermediate links 14 defines a spacing between its corresponding pair of outer links 18A, 18B. Preferably, the width W of each end is approximately equal to a thickness S of the engaged sprocket tooth. Furthermore, a cross sectional thickness T of each intermediate link is greater than the width W of the link. Thus, each intermediate link 14 has a generally thin and flat plate shape. In this embodiment, there are no other structures disposed between the ends of the intermediate links 14 and the ends of the corresponding pair of outer links 18A and 18B. In fact, the entire chain 15 is made up of only the intermediate links 14, the pairs of outer links 18A, 18B and the fasteners 22 as shown. The ends of the intermediate links 14 may contact the ends of the corresponding pair of outer links 18A, 18B, or there may be a small space between the ends of the intermediate links 14 and the ends of the corresponding pair of outer links 18A, 18B.

The outer link plates 18A and 18B are thin plates which are spaced apart from each other to define a space 19 for receiving a sprocket tooth therein. Outer link plate 18A includes a laterally curved intermediate portion 20A which curves away from outer link plate 18B, and outer link plate 18B includes a similar laterally curved intermediate portion 20B which curves away from outer link plate 18A. Laterally curved portions 18A and 18B help the sprocket tooth catch the chain during shifting.

Figure 5:
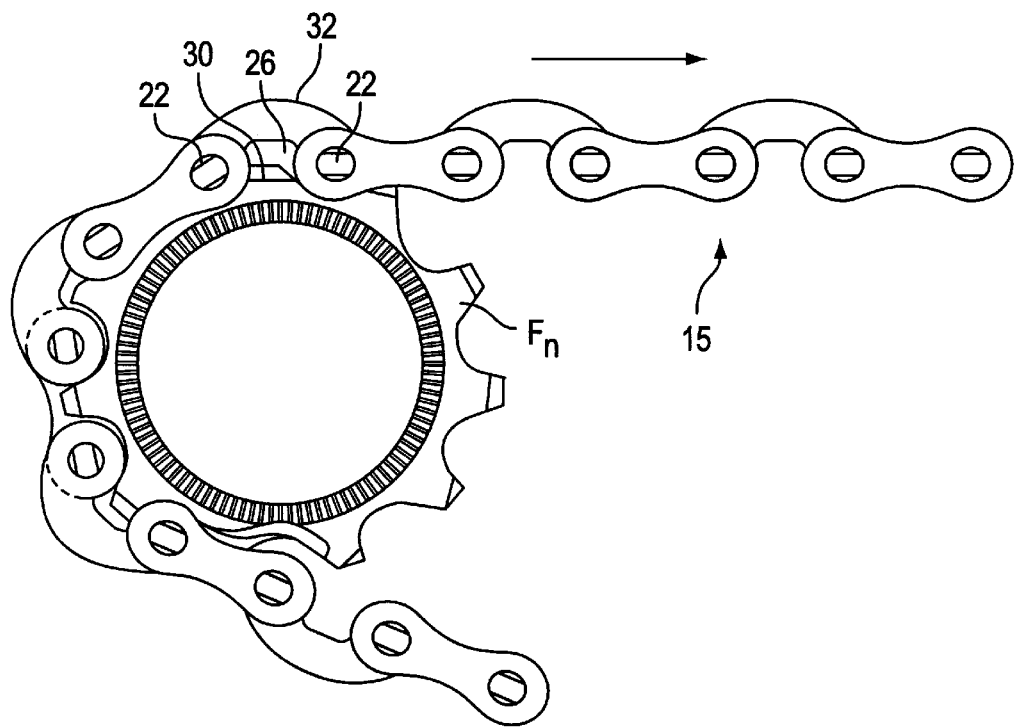
FIG. 5 is a side view of the bicycle chain shown in FIG. 3 engaging a sprocket.

As shown in FIGS. 3 and 5, each intermediate link 14 defines a recess 26 between each end thereof for receiving a sprocket tooth therein. FIG. 5 shows the example of chain 15 engaging a freewheel sprocket tooth 30, but the same applies when the chain engages one of the chainwheels. In this embodiment, recess 26 extends between the fasteners 22 at each end of the intermediate link 14 such that a phantom line L connecting the fasteners 22 at each end of each intermediate link 14 (e.g., the center point of each fastener) intersects the recess 26 therebetween. This allows each connecting pin 22 to be sandwiched between adjacent pairs of sprocket teeth. To accommodate recess 26 without compromising the strength of the link, the upper surface 32 of each intermediate link may be convex shaped.

Figure 6:
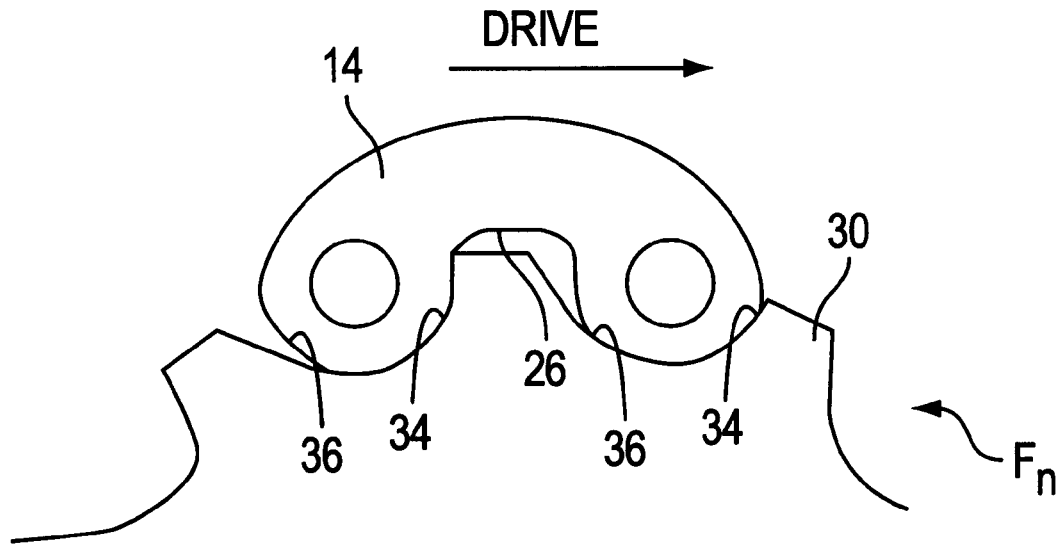
FIG. 6 is a detailed view showing how the bicycle chain shown in FIG. 3 engages a freewheel sprocket.
Figure 7:
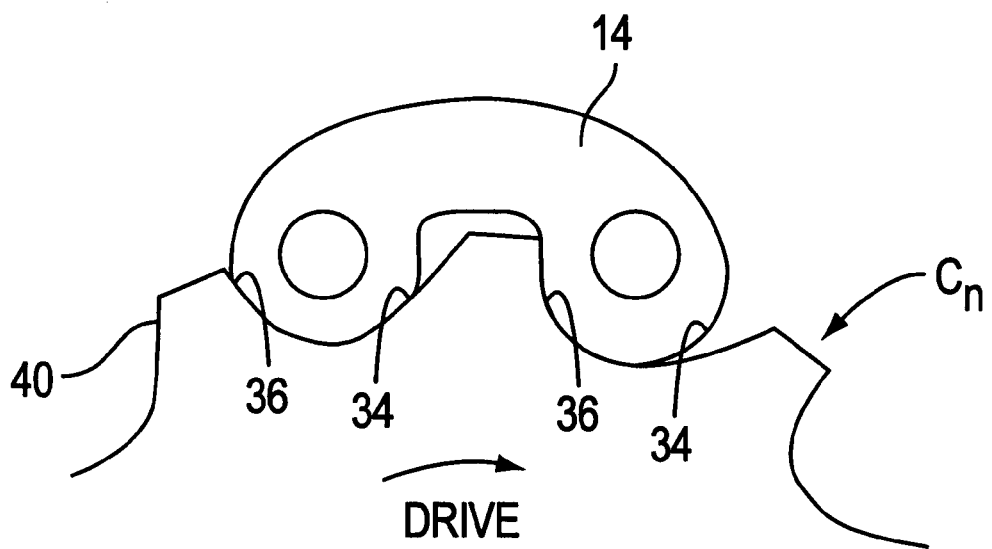
FIG. 7 is a detailed view showing how the bicycle chain shown in FIG. 3 engages a chainwheel sprocket.

FIG. 6 is a detailed view showing how the bicycle chain 15 engages a freewheel sprocket $F_n$, and FIG. 7 is a detailed view showing how the bicycle chain 15 engages a chainwheel sprocket $C_n$. Because of the position of recess 26 relative to the ends of each intermediate link 14, drive faces 34 and 36 are formed at each intermediate link 14. Since the rear wheel of the bicycle resists the drive force of the chain, drive faces 34 of each intermediate link 14 press against the rear surface of each freewheel sprocket tooth 30 as shown in FIG. 6. This resistance, in turn, causes chain 15 to resist the rotation of the chainwheels. As a result, the front face of each chainwheel tooth 40 presses against drive faces 36 as shown in FIG. 7. Drive faces 34 and 36 thus perform the function performed by the roller in conventional chains. Also, since each fastener 22 is sandwiched between pairs of adjacent sprocket teeth, stable contact of each drive face and reliable driving of the chain is obtained. To further enhance the performance of the chain, drive faces 34 and 36 may be contoured to match the rear and front surfaces, respectively, of the teeth they contact.

Figure 8:
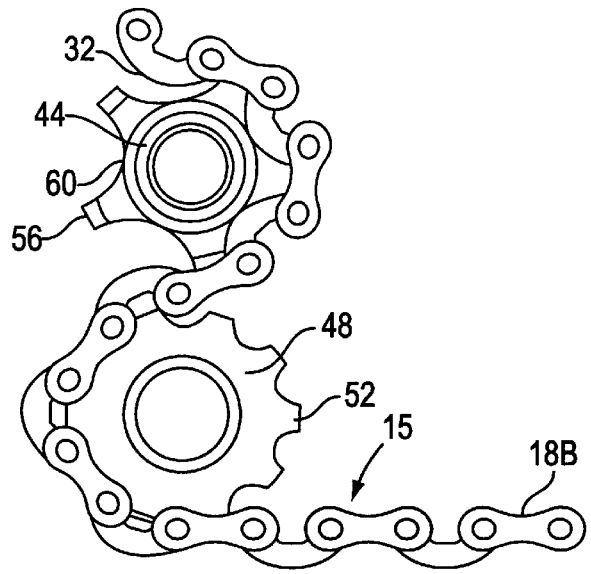
FIG. 8 is a detailed view illustrating an embodiment of guide and tension pulleys which may be used with the chain shown in FIG. 3.

FIG. 8 is a detailed view illustrating an embodiment of a derailleur guide pulley 44 and a derailleur tension pulley 48 which may be used with chain 15. Tension pulley 48 may be constructed in the usual way such that a tension pulley tooth 52 projects into each space between adjacent fasteners 22 in chain 15. However, because each intermediate link 14 in this embodiment has a convex surface 32 which does not accommodate sprocket teeth, guide pulley 44 has fewer sprocket teeth 56 so that sprocket teeth 56 project only into the space defined by each pair of outer links 18A and 18B. Guide pulley 44 has convex surfaces 60 for receiving the concave surfaces 32 of the plurality of intermediate links 14.

Figure 9:
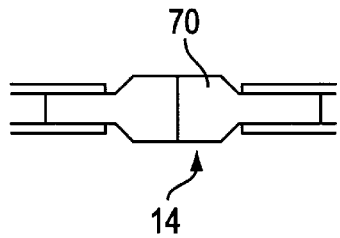
FIG. 9 is a top view of an alternative embodiment of an intermediate link which may be used in a bicycle chain according to the present invention.

FIG. 9 is a top view of an alternative embodiment of an intermediate link 14 which may be used in a bicycle chain 15 according to the present invention. In this embodiment, a middle portion 70 of each link 14 is wider than the end portions to increase the strength of the link.

Figure 10A:
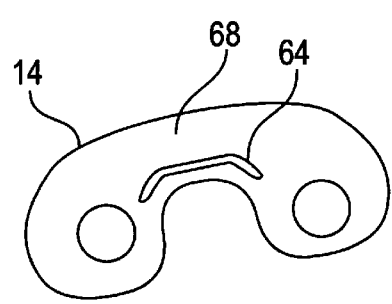
FIGS. 10A and 10B are side and rear views, respectively, of another alternative embodiment of an intermediate link which may be used in a bicycle chain according to the present invention.
Figure 10B:
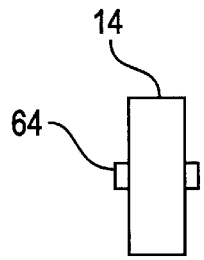

FIGS. 10A and 10B are side and rear views, respectively, of another alternative embodiment of an intermediate link 14 which may be used in a bicycle chain 15 according to the present invention. In this embodiment, a rib 64 projects laterally from a middle portion 68 of each link 14 to increase the strength of the link.

Figure 11:
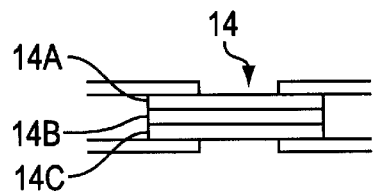
FIG. 11 is a top view of another alternative embodiment of an intermediate link which may be used in a bicycle chain according to the present invention.

FIG. 11 is a top view of another alternative embodiment of an intermediate link 14 which may be used in a bicycle chain 15 according to the present invention. In this embodiment, intermediate link 14 comprises a plurality of intermediate link plates 14A, 14B and 14C. The number of link plates may be varied according to the application.

While the above is a description of various embodiments of the present invention, further modifications may be employed without departing from the spirit and scope of the present invention. For example, the size, shape and orientation of the components may be changed as desired, and different types of fasteners may be used. There may be a thin friction bushing between the ends of the intermediate links 14 and the ends of the corresponding pair of outer links 18A and 18B, and the intermediate link 14 need not have a convex upper surface. One of the drive faces 34 or 36 may be omitted. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A derailleur bicycle chain for engaging a sprocket ($F_n$, $C_n$) having a plurality of sprocket teeth (30,40) comprising:
   a plurality of intermediate links (14);
   a plurality of pairs of outer links (18A, 18B);
   a plurality of fasteners (22), wherein each fastener (22) connects an end of one of the plurality of intermediate links (14) between a corresponding pair of outer links (18A, 18B) so that the plurality of intermediate links (14) alternate with the plurality of pairs of outer links (18A, 18B);
   wherein each intermediate link (14) includes a reinforcing rib (64) extending along an intermediate portion (68) thereof between a pair of the plurality of fasteners (22);
   wherein each intermediate link (14) defines a longitudinal bottom recess (26) between each end thereof for receiving one of said plurality of sprocket teeth (30, 40) therein, the recess (26) extending between the fasteners (22) at each end of the intermediate link (14);
   wherein a straight longitudinal phantom line (L) connecting centers of the fasteners (22) at each end of each intermediate link (14) intersects the recess (26) therebetween; and wherein each pair of outer links (18A, 18B) comprises first and second outer link plates (18A, 18B) facing each other, wherein each outer link plate (18A, 18B) includes a laterally curved middle portion (20A, 20B), wherein the laterally curved middle portion (20A) of the first outer link plate (18A) curves away from the second outer link plate (18B), and wherein the laterally curved middle portion (20B) of the second outer link plate (18B) curves away from the first outer link plate (18A).

2. The bicycle chain according to claim 1 wherein each end of each intermediate link (14) forms drive faces (34, 36) facing toward and away from the recess (26).

3. The bicycle chain according to claim 1 wherein each intermediate link (14) has a generally flat plate shape.

4. The bicycle chain according to claim 1 wherein a cross sectional thickness (T) of each intermediate link is greater than a width (W) thereof.

5. The bicycle chain according to claim 1 wherein each intermediate link (14) comprises a plurality of intermediate link plates (14A, 14B, 14C).

6. The bicycle chain according to claim 1 wherein each intermediate link (14) comprises a single solid member having a uniform width (W).

7. The bicycle chain according to claim 1 wherein an intermediate portion (70) of each intermediate link is wider than each end thereof.

8. The bicycle chain according to claim 1 wherein each pair of outer links (18A, 18B) defines a space (19) therebetween for receiving a sprocket tooth therein.

9. The bicycle chain according to claim 1 wherein the plurality of fasteners (22) each comprise a connecting pin.

10. The bicycle chain according to claim 1 wherein a width (W) of each end of the plurality of intermediate links (14) defines a spacing between a correspondingly adjacent pair of outer links (18A, 18B).

11. The bicycle chain according to claim 10 wherein each end of each intermediate link (14) contacts its corresponding pair of outer links (18A, 18B).

12. The bicycle chain according to claim 1 wherein each intermediate link (14) includes:
  a first reinforcing rib (64) extending laterally outwardly from one side of the intermediate link (14); and
  a second reinforcing rib (64) extending laterally outwardly from an opposite side of the intermediate link (14).

13. A driving apparatus for a bicycle comprising:
  a sprocket assembly (C, F) having a plurality of sprockets ($C_n$, $F_n$) mounted coaxially with each other, each sprocket ($C_n$, $F_n$) including a plurality of sprocket teeth (30, 40);
  a driving chain (15) for selectively engaging the sprocket teeth (30, 40) on one of the plurality of sprockets ($C_n$, $F_n$) including:
    a plurality of intermediate links (14);
    a plurality of pairs of outer links (18A, 18B);
    a plurality of fasteners (22), wherein each fastener (22) connects an end of one of the plurality of intermediate links (14) between a corresponding pair of outer links (18A, 18B) so that the plurality of intermediate links (14) alternate with the plurality of pairs of outer links (18A, 18B);
    wherein each intermediate link (14) includes a reinforcing rib (64) extending along an intermediate portion (68) thereof between a pair of the plurality of fasteners (22);
    wherein each intermediate link (14) defines a longitudinal bottom recess (26) between each end thereof for receiving one of said plurality of sprocket teeth (30, 40) therein, the recess (26) extending between the fasteners (22) at each end of the intermediate link (14);
    wherein a straight longitudinal phantom line (L) connecting centers of the fasteners (22) at each end of each intermediate link (14) intersects the recess (26) therebetween; and
    wherein each pair of outer links (18A, 18B) comprises first and second outer link plates (18A, 18B) facing each other, wherein each outer link plate (18A, 18B) includes a laterally curved middle portion (20A, 20B), wherein the laterally curved middle portion (20A) of the first outer link plate (18A) curves away from the second outer link plate (18B), and wherein the laterally curved middle portion (20B) of the second outer link plate (18B) curves away from the first outer link plate (18A); and
  a derailleur (6, 7) adapted to be attached to the bicycle for switching the driving chain (15) among the plurality of sprockets ($C_n$, $F_n$).

14. The apparatus according to claim 13 wherein each end of each intermediate link (14) forms drive faces (34, 36) facing toward and away from the recess (26).

15. The apparatus according to claim 13 wherein a width (W) of each end of the plurality of intermediate links (14) is approximately equal to a thickness (S) of a sprocket tooth.

16. The apparatus according to claim 13 wherein each intermediate link (14) has a generally flat plate shape.

17. The apparatus according to claim 13 wherein a cross sectional thickness (T) of each intermediate link (14) is greater than a width (W) thereof.

18. The apparatus according to claim 13 wherein each end of each intermediate link (14) contacts its corresponding pair of outer links (18A, 18B).

19. The apparatus according to claim 13 wherein each intermediate link (14) comprises a plurality of intermediate link plates (14A, 14B, 14C).

20. The apparatus according to claim 13 wherein each intermediate link (14) comprises a single solid member having a uniform width (W).

21. The apparatus according to claim 13 wherein an intermediate portion (70) of each intermediate link (14) is wider than each end thereof.

22. The apparatus according to claim 13 wherein each intermediate link (14) includes a reinforcing rib (64) extending along an intermediate portion (68) thereof.

23. The apparatus according to claim 13 wherein each pair of outer links (18A, 18B) defines a space (19) therebetween for receiving a sprocket tooth therein.

24. The apparatus according to claim 13 wherein the plurality of fasteners (22) each comprise a connecting pin.

25. The bicycle chain according to claim 13 wherein each intermediate link (14) includes:
  a first reinforcing rib (64) extending laterally outwardly from one side of the intermediate link (14); and
  a second reinforcing rib (64) extending laterally outwardly from an opposite side of the intermediate link (14).

* * * * *

UNITED STATES PATENT AND TRADEMARK OFFICE
CERTIFICATE OF CORRECTION

PATENT NO. : 5,921,881
DATED : July 13, 1999
INVENTOR(S) : Yasushi Nakamura

It is certified that error appears in the above-indentified patent and that said Letters Patent is hereby corrected as shown below:

In The Drawings: Figure 3, the bottom arrow at the lead line for reference letter T should stop at the middle phantom line.

In the Specification: Column 4, Line 8, change "convex" to --concave--.
Column 4, Line 8, change "concave" to --convex--.

Signed and Sealed this

Seventeenth Day of April, 2001

Attest:

NICHOLAS P. GODICI

Attesting Officer        Acting Director of the United States Patent and Trademark Office